United States Patent [19]

Ishida

[11] Patent Number: 5,223,832
[45] Date of Patent: Jun. 29, 1993

[54] SERIAL DATA TRANSMISSION CIRCUIT

[75] Inventor: Ryuji Ishida, Tokyo, Japan

[73] Assignee: NEC Corporation, Tokyo, Japan

[21] Appl. No.: 950,969

[22] Filed: Sep. 23, 1992

Related U.S. Application Data

[63] Continuation of Ser. No. 508,122, Apr. 11, 1990, abandoned.

[30] Foreign Application Priority Data

Apr. 14, 1989 [JP] Japan ................................ 1-94646

[51] Int. Cl.⁵ .............................................. H04Q 1/00
[52] U.S. Cl. ........................... 340/825.68; 340/825.62; 455/38.1
[58] Field of Search ....................... 340/825.68, 825.62, 340/825.44, 825.48, 825.08, 825.52; 364/715.08; 342/42; 455/38.1; 370/100.1

[56] References Cited

U.S. PATENT DOCUMENTS

| | | | |
|---|---|---|---|
| 4,399,437 | 8/1983 | Falck et al. | 340/825.54 |
| 4,514,731 | 4/1985 | Falck et al. | 340/825.08 |
| 4,614,944 | 9/1986 | Schwan | 340/825.68 |
| 4,694,293 | 9/1987 | Sugiyama et al. | 340/825.68 |

OTHER PUBLICATIONS

IBM Technical Disclosure, "Message Check Character for Serial Transmission System", by D. H. Rumble, vol. 3 No. 9 Feb. 1961 pp. 14-16.

*Primary Examiner*—Sandra L. O'Shea
*Assistant Examiner*—Brian Zimmerman

[57] ABSTRACT

A serial data transmission circuit for performing a data transmission in a serial form includes a data shift signal input terminal, a data latch signal input terminal, and an output selector, the output of which is connected to a serial data output terminal. A shift register is connected at its serial input to a serial data input terminal and at a part of its parallel outputs to the input of the selector. A barrel shifter is provided, connected at its input to the parallel outputs of the shift register. The circuit further includes a first data latch, the input of which is connected to the output of the barrel shifter, and a second data latch, the output of which is connected to the parallel inputs of the shift register. The output of the first data latch is connected to the input of the second data latch through an internal data bus. The serial data transmission circuit can output the serial data inputted in the state as inputted, in synchronization with the data shift signal, without an internal data transfer being effected by the selection of an appropriate parallel output from the shift register through the output selector and also by masking of the data latch signal.

7 Claims, 7 Drawing Sheets

BIT CLOCK 48 1 5 10 15 20 25 30 35 40 45 48 1

LR CLOCK

DATA [18][16 15 14 13 12 11 10 9 8 7 6 5 4 3 2 1][18]

FORMAT 201 (BIT CLOCK 48 fs / 18 BIT DATA LENGTH)

DATA [16][14 13 12 11 10 9 8 7 6 5 4 3 2 1][16]

FORMAT 202 (BIT CLOCK 48 fs / 16 BIT DATA LENGTH)

301
302
303

BIT CLOCK 32 1 5 10 15 20 25 30 32 1

LR CLOCK

DATA [16][14 13 12 11 10 9 8 7 6 5 4 3 2 1][16]

FORMAT 203 (BIT CLOCK 32 fs / 16 BIT DATA LENGTH)

FORMAT 501 (18 BIT DATA LENGTH)

FORMAT 502 (16 BIT DATA LENGTH)

FIG. 6
PRIOR ART

SERIAL DATA TRANSMISSION CIRCUIT

This is a continuation of application Ser. No. 07/508,122, filed Apr. 11, 1990 now abandoned.

BACKGROUND OF THE INVENTION

The present invention relates to a signal processing device and, more particularly, to an audio data transmission circuit which performs a data transmission in a serial form.

Conventionally, a serial data transmission circuit of this kind is so arranged that each of the input portion and output portion thereof is provided with a separate data shift circuit.

Disadvantages in such conventional serial data transmission circuit are that the provision of the two data shift circuits results in an increase in the size of the circuit and that, in order to make the serial data transmission circuit adaptable to various kinds of serial data, whose data lengths are different from one another or operable under various kinds of transmission clock signals, it is necessary to provide at an input and output portion, respectively, the data shift circuits of their own, which results in a still further increase in the overall circuit scale.

In the conventional serial data transmission circuit referred to above, even in the instances where the serial data inputted is to be outputted in the state as inputted so as not to leave any interruption in the transmission data, for example, when the operation mode in the signal processing device is changed, that is, where the data as inputted may be outputted without any changes at the digital signal processing device, it is necessary to effect the data transfer from the one data shift circuit at the input side to the other data shift circuit at the output side. For this process, the internal data bus is occupied, which prevents the signal processing block from performing any other processes independent of the above data transfer and which results in the lowering of the overall processing speed.

Furthermore, there is a disadvantage that the conventional arrangement, wherein the input data shift circuit and the output data shift circuit are independent from each other, unavoidably causes the occurrence of jitter between the transmission clock signal for the input side circuit and that for the output side circuit.

SUMMARY OF THE INVENTION

It is an object of the present invention to provide an improved serial data transmission circuit which has overcome the above described disadvantages in the conventional circuit.

It is another object of the present invention to provide an improved serial data transmission circuit, the circuit scale of which can be made considerably smaller than that in the conventional circuit.

It is a further object of the present invention to provide a serial data transmission circuit which can output the inputted, serial data in the state as inputted without any internal data transfer process being effected through an internal data bus, thereby allowing the digital signal processing means to perform any other processes which may be required and which are independent of the data transfer process.

According to the present invention there is provided a serial data transmission circuit for a data transmission in a serial form, comprising:

a serial data input terminal receiving a serial data externally applied thereto;

a serial data output terminal outputting the processed serial data;

a transmission clock input terminal receiving a data shift signal;

a word cycle signal input terminal receiving a data latch signal;

a parallel data input terminal and a parallel data output terminal communicated to the serial data transmission circuit through an internal data bus;

a selecting means whose output is connected to the serial data output terminal;

a data shift means whose serial input is connected to the serial data input terminal and a part of whose parallel output is connected to the input of the selecting means;

a bit position shifting means whose input is connected to the parallel outputs of the data shift means;

a first data latch means whose input is connected to the output of the bit position shifting means and whose output is connected to the parallel data output terminal; and a second data latch means whose input is connected to the parallel data input terminal and whose output is connected to the parallel input of the data shift means.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

For the purpose of assisting in the understanding of the present invention and a general concept of a serial data transmission, a conventional serial data transmission circuit will first be described by making reference mainly to FIG. 6 before the explanation of the present invention.

Figure 6:
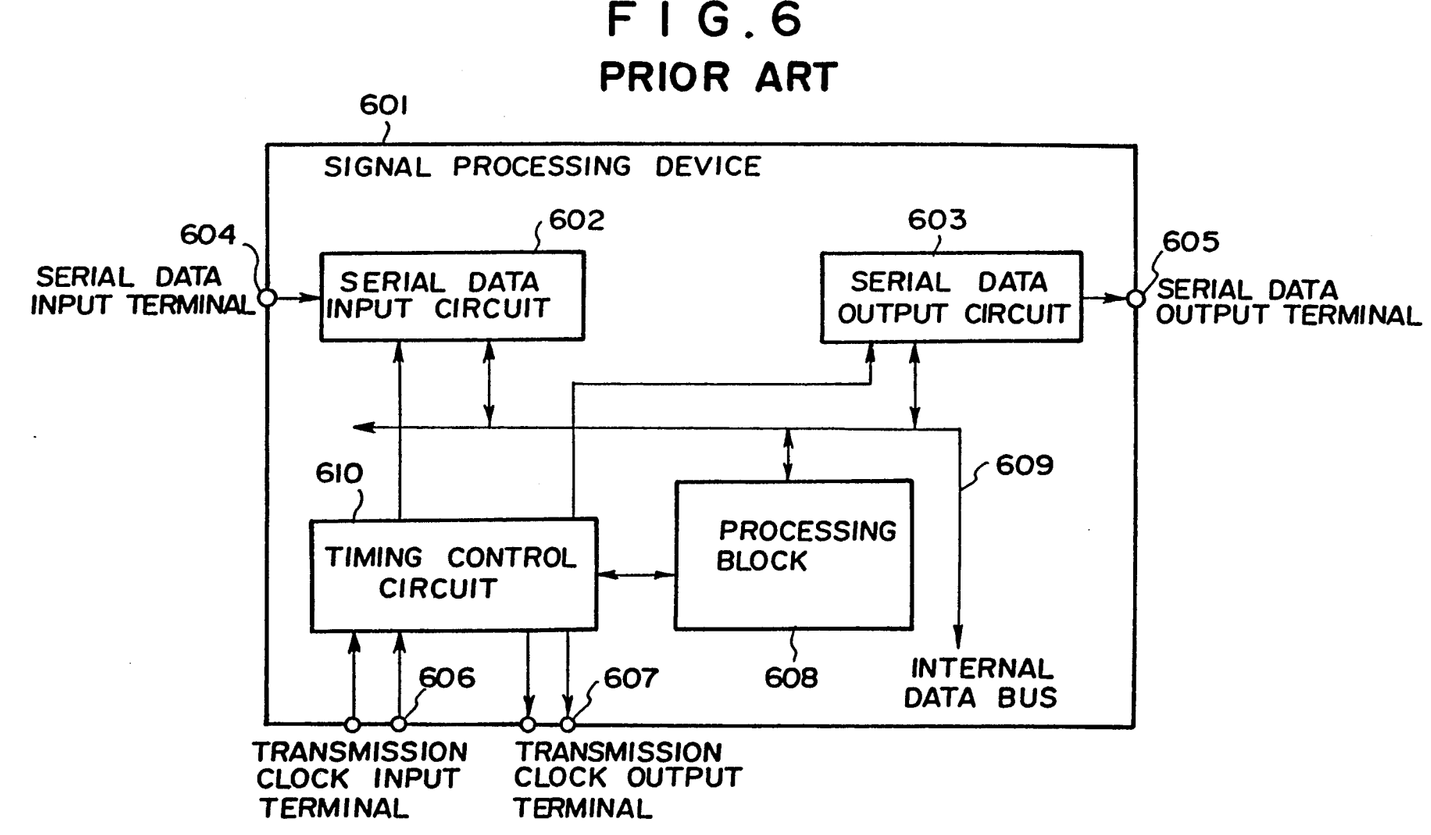
FIG. 6 shows a block diagram of a conventional serial data transmission circuit.

The conventional circuit as shown in FIG. 6 includes a serial data input circuit 602, a serial data output circuit 603, a serial data input terminal 604, a serial data output terminal 605, a serial data transmission clock output terminal 607, a signal processing block 608 and an internal data bus 609. The serial data input terminal 604 is connected to the input of the serial data input circuit 602 and the output of this serial data input circuit 602 is connected to the internal data bus 609. The data inputted is processed at the signal processing block 608 which is connected to the internal data bus 609, is outputted back to the internal data bus circuit 603 which is likewise connected to the internal data bus 609. The output of the serial data output circuit 603 is connected to the serial data output terminal 605. On the other hand, the serial data transmission clock which comprises a transmission clock and a word cycle signal is inputted from a serial data transmission clock input terminal 606 and forwarded to a timing control circuit 610. The timing control circuit 610 controls both the timings of the serial data transmission of the serial data input circuit 602 and the serial data output circuit 603.

Figure 2:
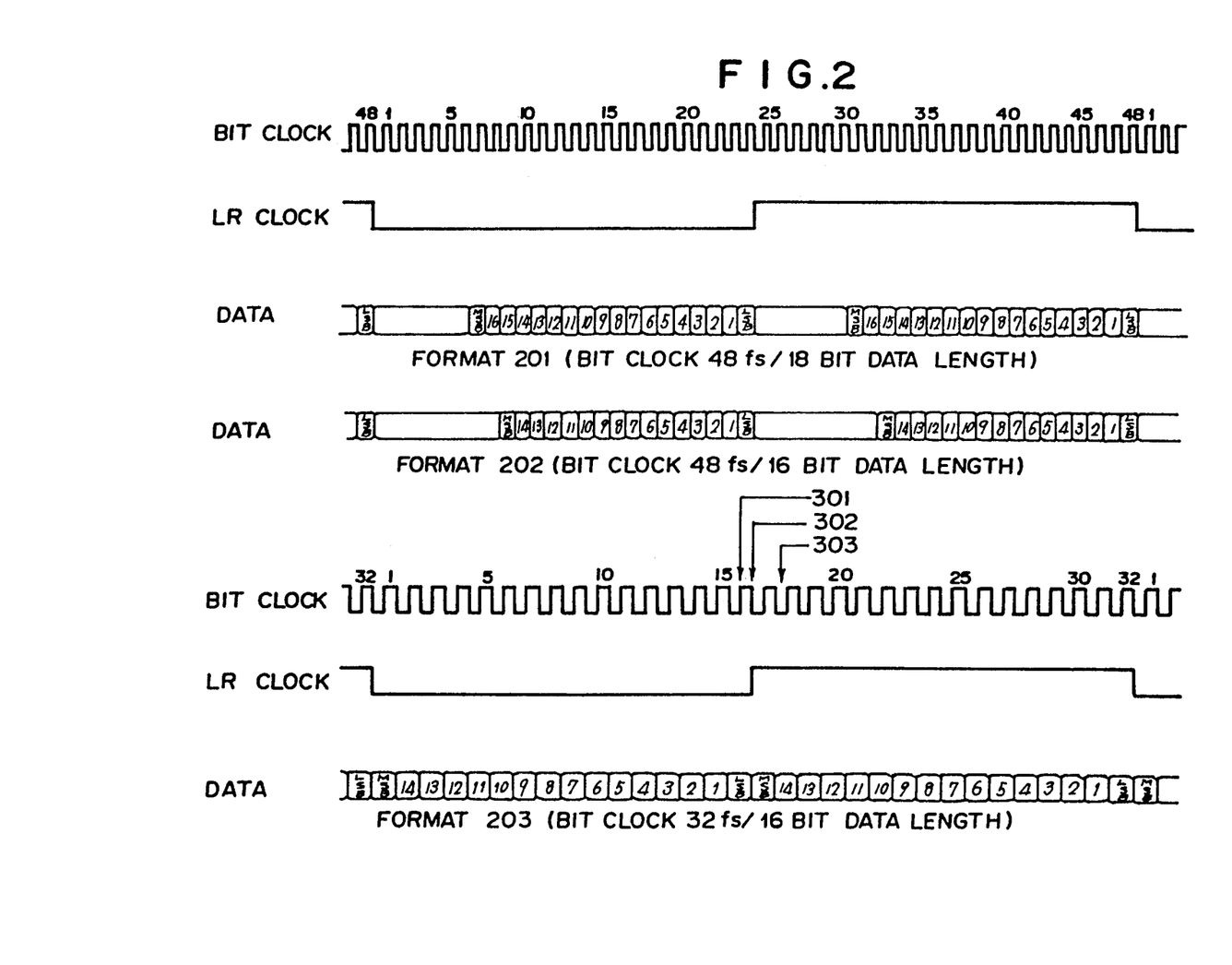
FIG. 2 shows various data transmission formats of a serial data interface.

For example, the audio data transmission is carried out by way of a serial data transmission normally with the use of the transmission formats as shown in FIG. 2 or FIG. 6. In this instance, the transmission clock is of a bit clock and the signal indicating a transfer cycle of each word is an LR clock. This LR clock corresponds to the sampling cycle of the audio data. The audio data sampled out at each sampling cycle is transferred one word at a time in synchronization with the LR clock and is eventually converted into an analog signal which is synchronized with the LR clock. The audio data is inputted from the serial data input terminal 604.

At an audio signal processing means involved in the circuit, the audio data to be transmitted serially is taken out after being converted into parallel form, subjected to filtering processes such as multiplication and addition and is sent out in synchronization with the LR clock after being converted back to serial form.

Figure 5:
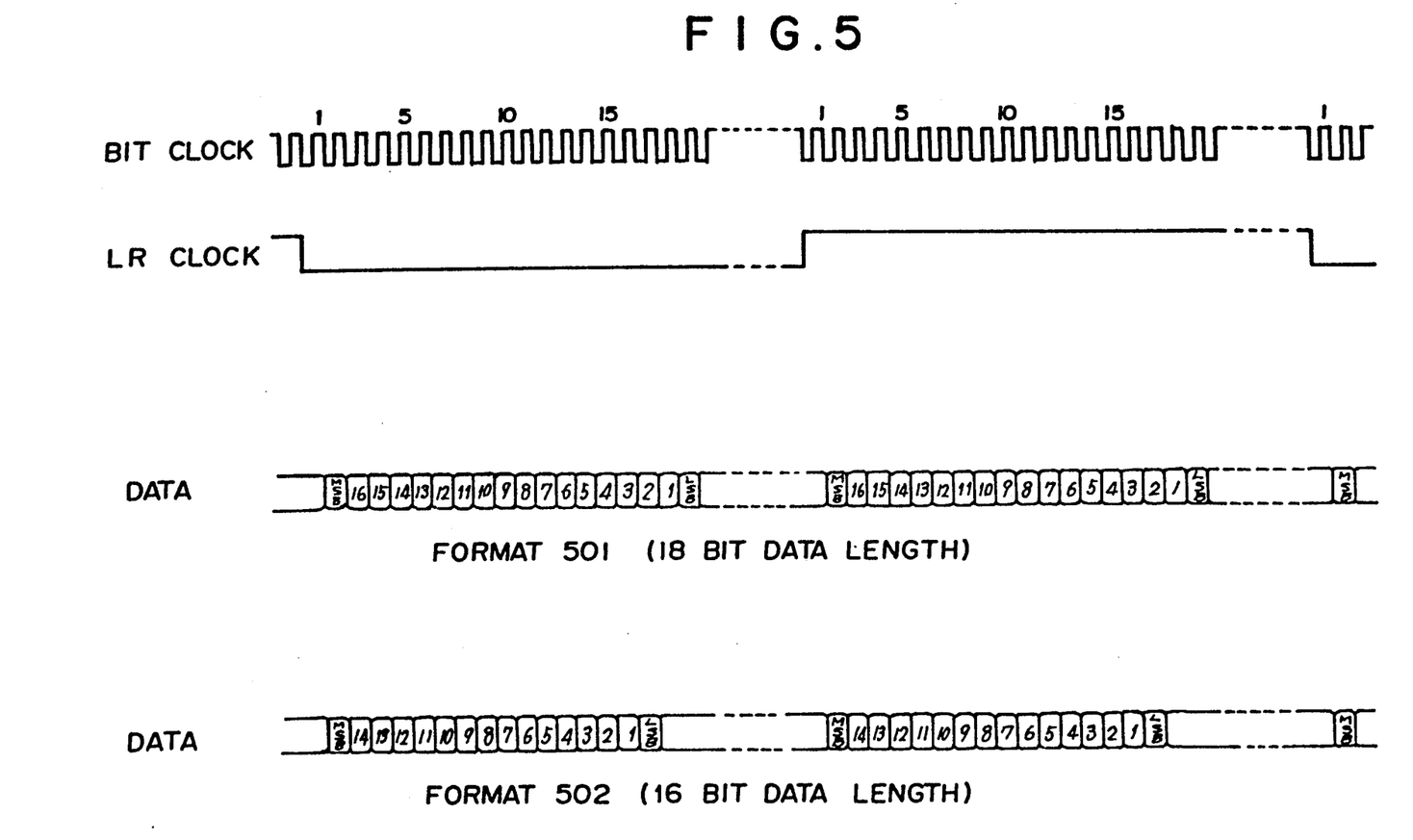
FIG. 5 shows other data transmission formats of a serial data interface.

As for the transmission clock, there are various types including one wherein the frequency used is 48 times the word cycle signal, which corresponds to the transmission formats 201, 202 shown in FIG. 2, wherein the frequency used is 32 times the word cycle signal, which corresponds to the transmission format 203 also shown in FIG. 2, or wherein there are no particular specification as shown in FIG. 5. The length of the data to be transmitted may be of 18 bits (201, 501 formats), 16 bits (202, 203, 502 formats), etc. The transmission clock rate and the transmission data length depend on the audio data output means which are connected to the serial data input terminal. Thus, for the serial data transmission circuit to be adapted to many varieties of audio data output means, it is necessary for it to be adaptable to many varieties of data transmission formats.

Now hereunder the present invention is explained with reference to the appended drawings.

Figure 1:
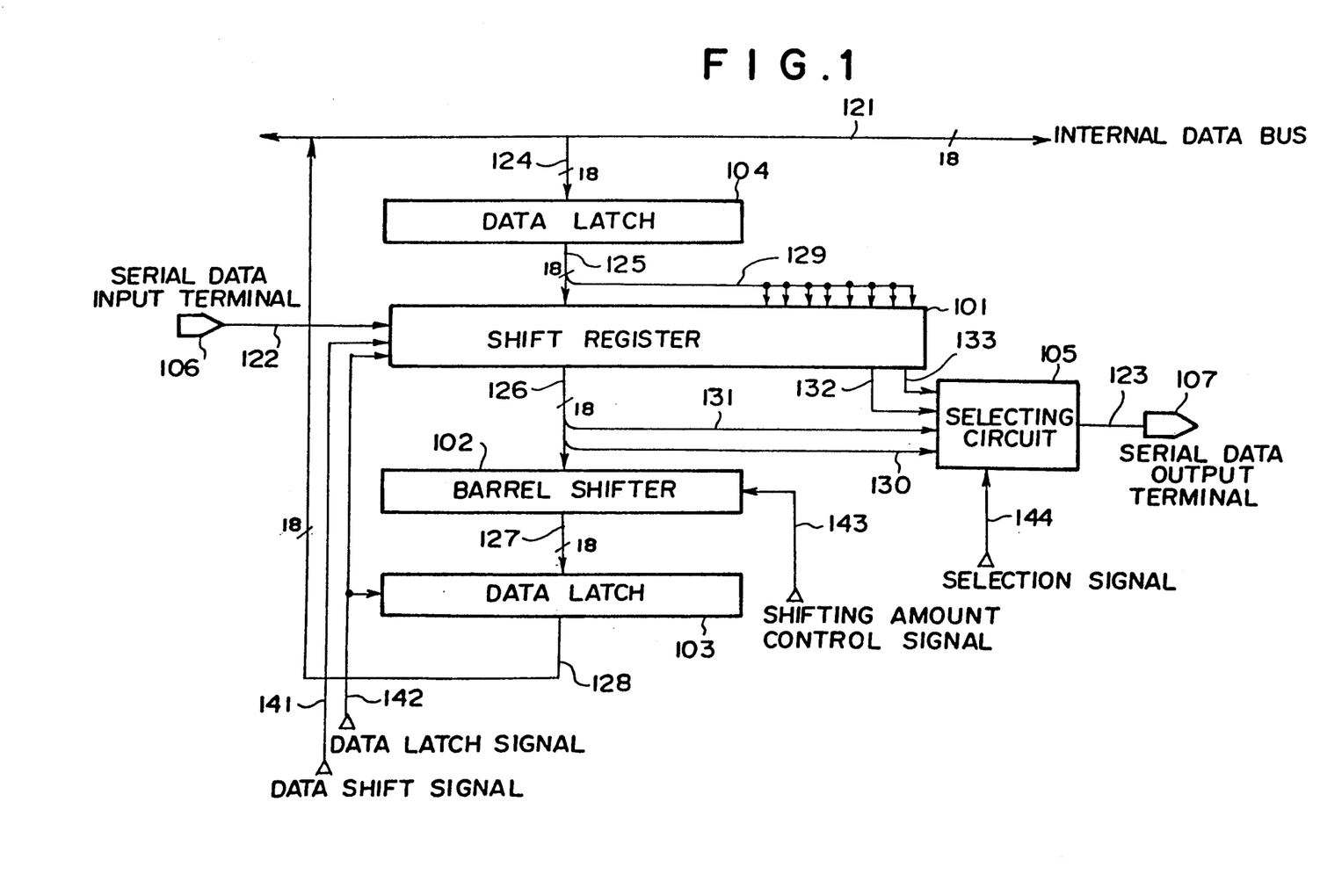
FIG. 1 shows a block diagram of a serial data transmission circuit according to a first embodiment of the present invention.

FIG. 1 shows a first embodiment of the present invention in a block diagram.

According to this embodiment of the invention, the circuit comprises a shift register 101, a barrel shift 102, two data latches 103 and 104, a selecting circuit 105, a serial data input terminal 106, a serial data output terminal 107, an internal data bus 121 which is connected to data latch 104 through a data line 124 to receive data of 18 bits processed in a data processing unit and stored in the data latch 104, and to a data latch 103 through a data line 128 to transfer data of 18 bits from the data latch 103 to the data processing unit, respectively, as explained below. Data line 122 is provided to transfer data supplied externally or serially at an input terminal 106. The circuit further includes data lines 123, 125, 126, 127, 129, 130, 131, 132 and 133, a terminal for data shift signal 141, a terminal for data latch signal 142, a terminal for shifting amount control signal 143 and a terminal for selection signal 144.

Figure 1A:
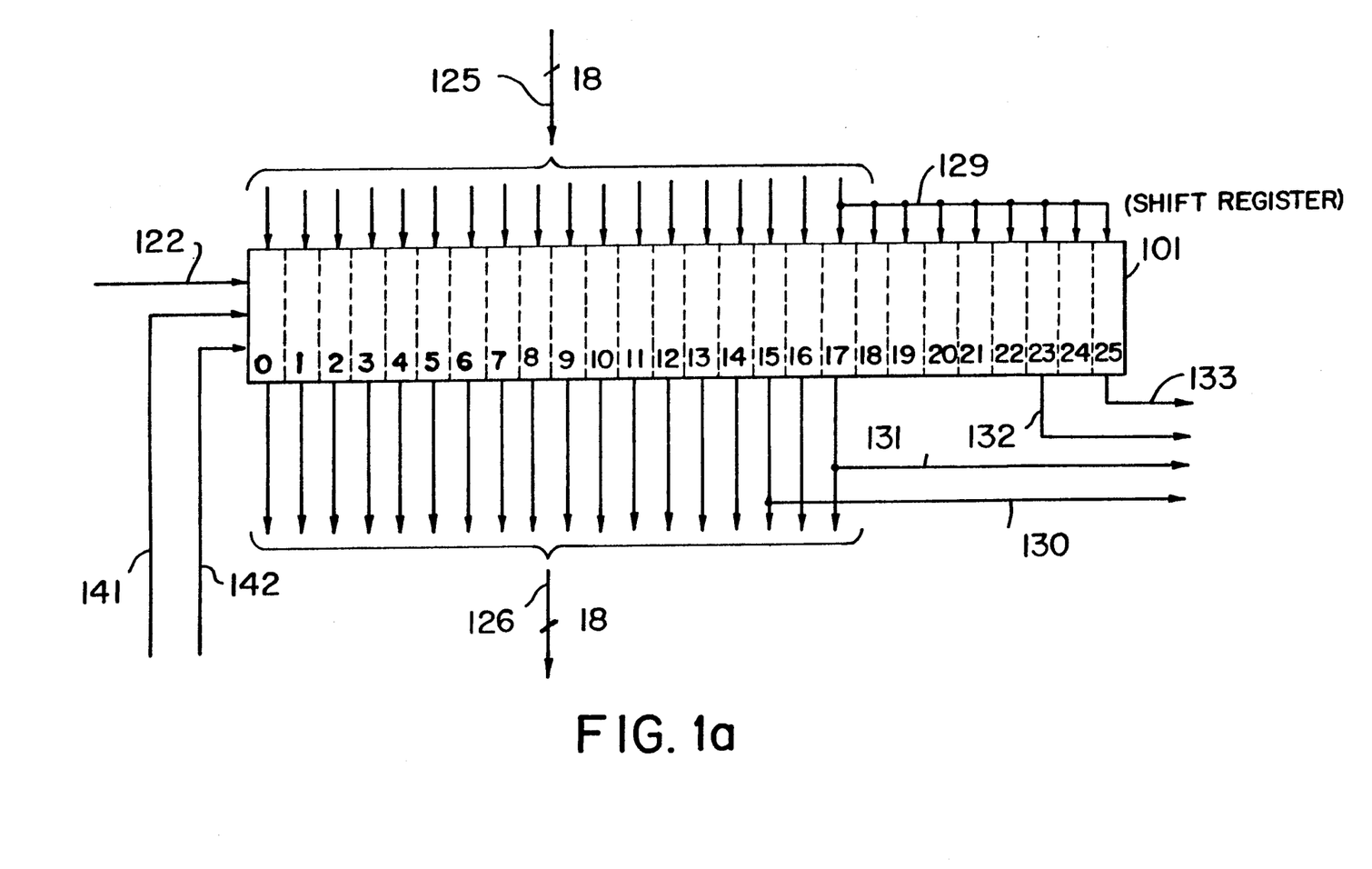
FIG. 1a shows connections of a shift register of the serial data transmission circuit of FIG. 1, on enlarged scale.

As seen in FIG. 1a, the shift register 101 is a shift register which is of 26 bit width having functions of parallel inputting and parallel outputting of the serial data and in which the serial data input terminal is connected to the data line 122, the shift timing of the data is given by the data shift signal 141 and the parallel data is taken-in in synchronization with the data latch signal 142. As to the shift register 101, if each bit is bit 0, bit 1, ..., bit 25 from the lowest digit position, the parallel data input terminals of bit 0-bit 17 are connected to the data line 125 and the parallel data input terminals of bit 18-bit 25 are connected to the data line 129. Further, the parallel data output terminals of bit 0-bit 17 are connected to the data line 126, the output terminal of bit 23 is connected to the data line 132 and the output terminal of bit 25 is connected to the data line 133.

The barrel shifter 102 is a shifter which is of 18 bit width and from which, depending on the values indicated by the shifting amount control signal 143, outputted is either the data of 18 bit width without any change therein or the data shifted 2 bits upwardly in digit but added with "0" at each of the lower 2 bit positions. The data line 126 is connected to the input terminal of the barrel shifter 102 and the data line 127 is connected to the output terminal thereof.

The data latch 103 is a data latch which is of 18 bit width and in which the data inputted through the data line 127 is latched synchronously with the data latch signal 142 which is a signal indicating the ending timing of the data transfer for one word. The output terminal of the data latch 103 is connected to the data line 128 connected to the internal data bus 121. The data latch 104 is a latch which is of 18 bit width and in which the input terminal is connected to the data line 124, which is in turn connected to the internal bus 21, and the output terminal is connected to the data line 125.

The selecting circuit 105 is a circuit which selects one input from among the 4 inputs according to the value indicated by the selection signal 144 and outputs the input thus selected. The four input terminals thereof are connected to the data lines 130, 131, 132 and 133, respectively, and the output terminal thereof is connected to the data line 123.

The serial data input terminal 106 is connected to the data line 122. The serial data output terminal 107 is connected to the data line 123.

The internal data bus 121 is a data bus of 18 bit width. Each of the data lines 124, 125, 126, 127 and 128 is a data line of 18 bit width.

The data line 129 is connected to the highest bit position of the data line 125.

When each bit position of the data line 126 is bit 0, bit 1-bit 17 from the lowest digit position, the bit 15 is connected to the data line 130 and the bit 17 is connected to the data line 131. Selection between data lines 130, 131, 132 and 133 is made by selecting unit 105, as explained below.

Hereinafter, the operation of the circuit of this first embodiment is explained. The embodiment relates to a data input and output circuit of an audio signal processing device with which the inputting and outputting of the audio data is carried out.

The serial data transmission formats for the audio data normally used are those as shown in FIG. 2. The audio data is transferred by each word of 16 bits or 18 bits in synchronization with the LR clock which indicates the property of a data word. Also, each bit information is transferred in synchronization with the bit clock of the frequency 32 times (16 bit length only) or 48 times (16 bits or 18 bits) that of the LR clock.

With respect to the bit clock shown in FIG. 2, both the transmitting formats 201, 202 are of the frequency 48 times that of the LR clock and the transmission format 203 is of the frequency 32 times that of the LR clock. The bit clock is used as a data shift signal. The LR clock is used as a data latch signal. The audio data is transmitted one bit at a time in MSB (Most Significant Bit) first in synchronization with the bit clock, the data transmission being in the right-justified position against the inversion edge of the LR clock. The audio data is inputted from the serial data input terminal 106. At each sampling cycle the audio data of 16 or 18 bits are inputted from the serial data input terminal 106. The data latch signal 142 becomes active in response to the edge of the LR clock indicating the word timing of the given data and the bit clock is inputted to the data shift signal 141.

Hereinafter is explained the performance of the circuit in the instance where the frequency of the bit clock is 32 times that of the LR clock. Here the data length of audio data is of 16 bits.

It is arranged that, in the internal data bus 121, the audio data of 16 bits may be inputted in the up-justified form.

The audio data inputted from the serial data input terminal 106 are taken into the shift register 101 in synchronization with the data shift signal 141 and, when the data transmission of 16 bits is fully completed, the data are held in the bit 15-bit 0 positions of the shift register 101. Here, if the barrel shifter 102 is instructed through the shifting amount control signal 143 for the upper 2 bits shifting, the audio data are latched in the upper 16 bit positions among the 18 bit positions at the data latch 103 in response to the data latch signal 142 inputted in synchronization with the inversion of the LR clock. Also, at the same time, the audio data held at the data latch 104 are inputted to the shift register 101. If the data line 131 is selected through the selecting circuit 105, the output audio data held at the shift register 101 is outputted from the serial data output terminal 107 in synchronization with the data shift signal 141, that is, the bit clock. At the audio signal processing means, the input data are taken-out from the data latch 103 at any time until the next inversion of the LR clock and the output data are written-in in the data latch 104.

Figure 3:
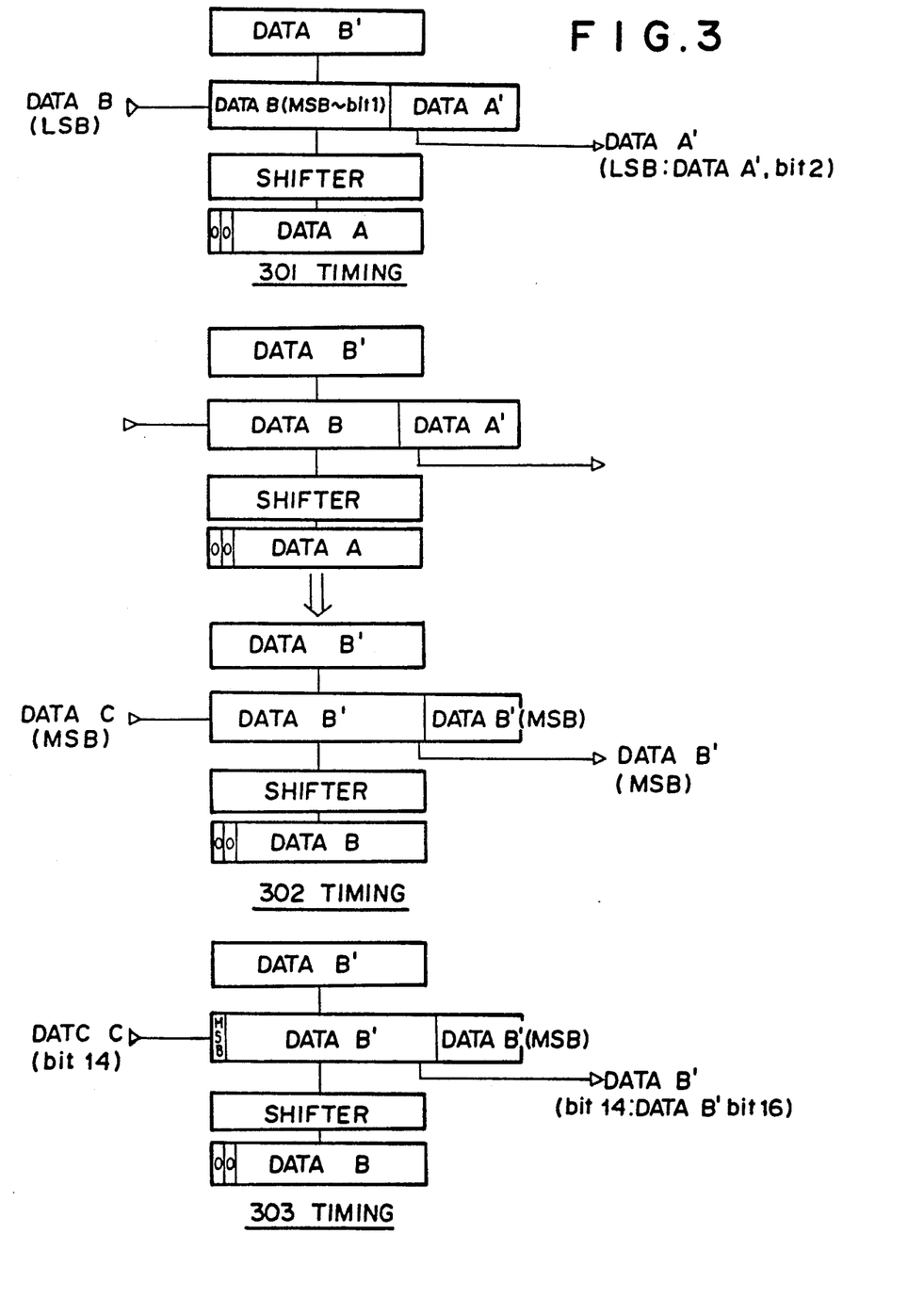
FIG. 3 shows timing charts of the data transmission in the embodiments of the invention.

FIG. 3 shows the typical states of internal data at various timings. Shown by each of 301, 302, and 303 is the state of internal data in each register and shifter at the given timing as shown in FIG. 2.

At the timing 301, the data up to MSDB—bit 1 from among the present data B are inputted to the shift register 101 and, at the data latch 103, the previously inputted data A are held at the upper 16 bit positions and "0" is held at the lower 2 bit positions. At the data latch 104, there are held the output data B for the next cycle.

At the timing 302, firstly the input data B are inputted in all bits in the shift register 101 and secondly the data B held at the shift register 101 are shifted 2 bits upwardly by the barrel register 102 and are latched at the data latch 103. At the same time, the data B held at the data latch 104 are taken into the shift register 101 and the most significant bit (MSB) of the data B' is outputted from the serial data output terminal 107.

At the timing 303, the most significant bit of the data C which are the next cycle input data is taken into the least significant bit position of the shift register 101 and the bit 16 of the data B' is outputted from the serial data output terminal 107.

By masking the data latch signal 142 and selecting the data line 130 through the selecting circuit 105, it is possible to output the inputted audio data in the sate as inputted, that is, without any changes therein.

Next, the explanation is made of the performance of the arrangement wherein the frequency of the bit clock is 48 times that of the LR clock and the audio data length is of 16 bits.

The audio data inputted from the serial data input terminal 106 are taken into the shift register 101 in synchronization with the data shift signal 141 and, when the data transmission for one word is fully completed, the data of 16 bits are held in the bit 15-bit 0 positions of the shift register 101. Here, if the barrel shifter 102 is instructed through the shifting amount control signal 143 as to the upper 2 bits shifting, the audio data are latched in the upper 16 bit positions among the 18 bit positions at the data latch 103 in response to the data latch signal 142 inputted in synchronization with the invention of the LR clock. Also, at the same time, the audio data held at the data latch 104 are inputted to the shift register 101. If the data line 133 is selected through the selecting circuit 105, the output audio data held at the shift register 101 is outputted from the serial data output terminal 107 in the transmission format 202 shown in FIG. 2. At the audio signal processing means, the input data are taken-out from the data latch 103 at any time until the next inversion of the LR clock and the output data are written-in in the data latch 104.

By masking the data latch signal 142 and selecting the data line 132 through the selecting circuit 105, it is possible to output the inputted audio data as inputted, that is, without any changes therein.

Next, the explanation is made of the performance of the arrangement wherein the frequency of the bit clock is 48 times that of the LR clock and the audio data length is of 18 bits.

The audio data inputted from the serial data input terminal 106 are taken into the shift register 101 in synchronization with the data shift signal 141 and, when the data transmission for one word is completed, the data of 18 bits are held in the bit 17-bit 0 positions of the shift register 101. Here, if the barrel shifter 102 is instructed in response to the shifting amount control signal 143 as to the "0" shifting, the audio data of 18 bits are latched at the data latch 103 through the data latch signal 142 inputted in synchronization with the inversion of the LR clock. At the same time, the audio data held at the data latch 104 are inputted to the shift register 101. If the data line 132 is selected through the selecting circuit 105, the output audio data held at the shift register 101 is outputted from the serial data output terminal 107 in the transmission format 201 shown in FIG. 2. At the audio signal processing means, the input data are taken-out from the data latch 103 at any time until the next inversion of the LR clock and the output data are written-in in the data latch 104.

By masking the data latch signal 142 and selecting the data line 132 through the selecting circuit 105, it is also possible to output the inputted audio data as inputted, that is, without any changes therein.

By the selecting circuit 105, any one of the data lines 130, 131, 132 and 133 is connected to the output data line 123 in response to the selection signal 144.

When the value indicated by the selection signal 144 is "0", the data line 130 is connected to the data line 123.

When the data line 130 connected to the output of bit 15 position of the shift register 101 is selected and, at the same time, the data latch signal 142 is masked, it is possible to have the inputted data of 16 bits outputted for the next cycle without effecting any internal data transfer process in carrying out the data transmission with the use of the transmission format 203 as shown in FIG. 2.

When the value indicated by the selection signal 144 is "1", the data line 131 is connected to the data line 123. The data line 131 is connected to the output of bit 17 position of the shift register 101. Here the data of the upper 16 bits of the output data held at the data latch 104 are outputted in synchronization with the data shift signal 141, which enables the data transmission according to the data transmission format 203 shown in FIG. 2.

When the value indicated by the selection signal 144 is "2", the data line 132 is connected to the data line 123. The data line 132 is connected to the output of bit 23 position of the shift register 101. Here the data of 18 bits are outputted following MSB 6 bits which are the data expanded from those held at the latch 104, which enables the data transmission according to the data transmission format 201 shown in FIG. 2. If, at the same time, the data latch signal 142 is masked, it is possible to have the inputted data of 24 bits outputted for the next cycle without effecting any internal data transfer process in carrying out the data transmission with the use of the transmission format 201 or 202.

When the value indicated by the selection signal 144 is "3", the data line 133 is connected to the data line 123. The data line 133 is connected to the output of bit 25 position of the shift register 101. Here the data of the upper 16 bits are outputted following MSB 8 bits which are the data expanded from those held at the latch 104, which enables the data transmission according to the data transmission format 202 shown in FIG. 2.

Figure 4:
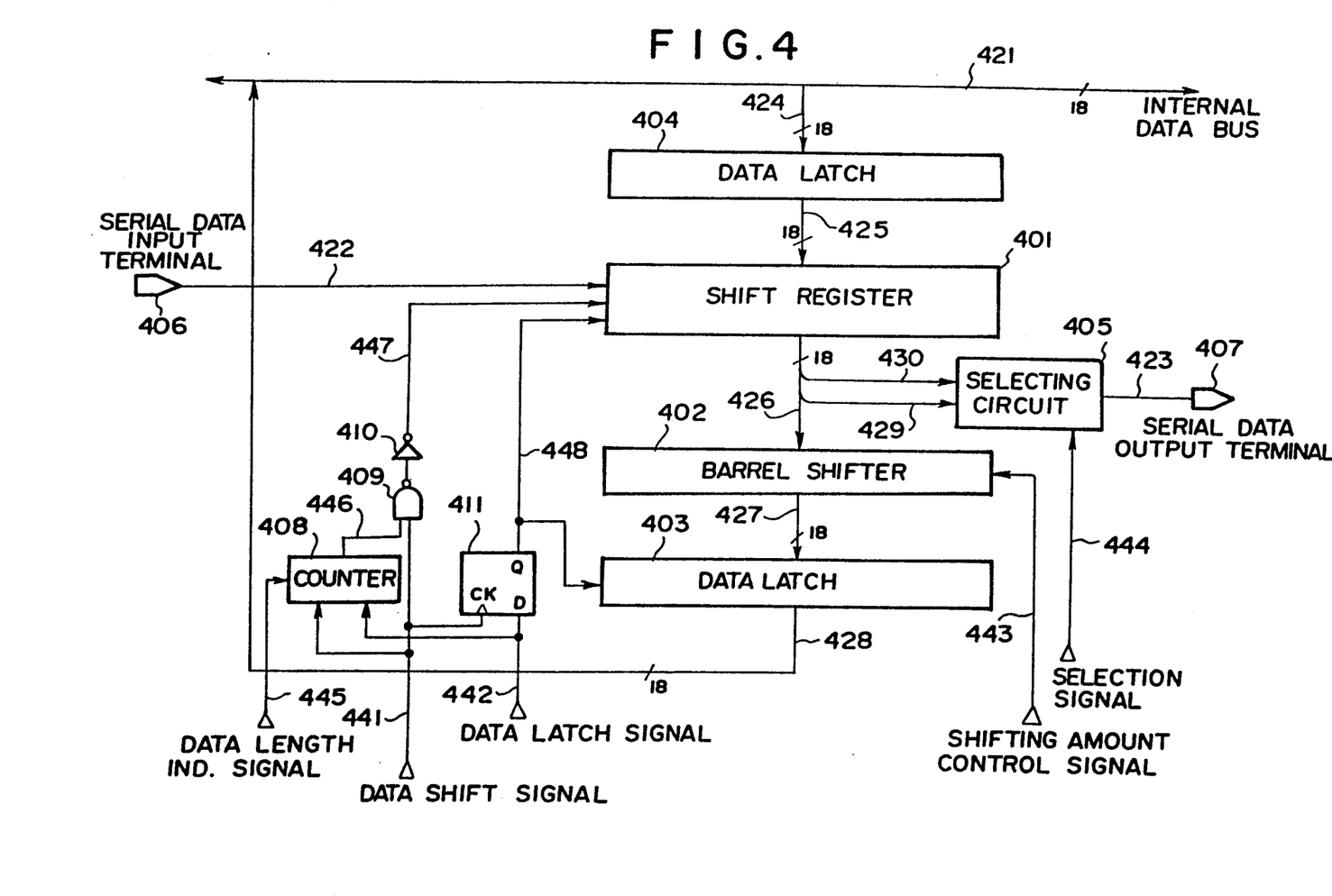
FIG. 4 shows a block diagram of a serial data transmission circuit according to a second embodiment of the present invention.

FIG. 4 shows another embodiment of the present invention in a block diagram.

According to this second embodiment of the invention, the circuit comprises a shift register 401, a barrel shifter 402, two data latches 403 and 404, a selecting circuit 405, a serial data input terminal 406, a serial data output terminal 407, a counter 408, a two-input NAND gate 409, a NOR gate 410, a D-type flip-flop 411, an internal data bus 421, a plurality of data lines 422, 423, 424, 425, 426, 427, 428, 429 and 430, a terminal for data shift signal 441, a terminal for data latch, signal 442, a terminal for shifting amount control signal 443, a terminal selection signal 444, a terminal for data length indicating signal 445, a terminal for data shift enabling signal 446, a terminal for data shift signal 447 and a terminal for data latch signal 448.

The shift register 401 is a shift register which is of 18 bit width having functions of parallel inputting and parallel outputting of the data and in which the serial data input is connected to the data line 422, the shift timing of the data is given by the data shift signal 447 and the timing for taking-in the parallel data is given by the data latch signal 448 produced at the D-type flip-flop 411 based on the data shift signal 441 and the data latch signal 442. The input of the parallel data of the shift register 401 is connected to the data line 425 and the output of the parallel data is connected to the data line 426.

The barrel shifter 402 is a shifter which is of 18 bit width and from which, depending on the values indicated by the shifting amount control signal 443, outputted is either the data of 18 bit width, without any changes therein, or the data shifted 2 bits upwardly in digit position but added with "0" at each of the lower 2 bit positions. The data line 426 is connected to the input of the barrel shifter 402 and the data line 427 is connected to the output of the barrel shifter 402.

The data latch 403 is a data latch which is of 18 bit width and in which the data inputted through the data line 427 is taken-in through the data line 427 at the timing of the data latch signal 448 which is a signal indicating the transfer ending timing of the data for one word. The output of the data latch 403 is connected to the data line 428.

The data latch 404 is a latch which is of 18 bit width and in which the input is connected to the data line 424 and the output is connected to the data line 425.

The selecting circuit 405 is a circuit which selects either one of the two inputs according to the value indicated by a selection signal 444 and in which the two inputs are connected to the data lines 429, 430, respectively, and the output is connected to the data line 423.

The serial data input terminal 406 is connected to the data line 422. The serial data output terminal 407 is connected to the data line 423.

The counter 408 makes active the data shift enabling signal 446 during the period of 16 cycles or 18 cycles of the data shift signal 441 starting from the trailing edge of the data shift signal 441 immediately following the data latch signal 442 becoming active according to the value indicated by the data length indicating signal.

The internal data bus 421 is a bus line of 18 bit width. Each of the data line 424, 425, 426, 427 and 428 is of a data line of 18 bit width.

When each bit position of the data line 426 is bit 0, bit 1-bit 17 from the lowest bit position, the bit 15 position is connected to the data line 429 and the bit 17 position is connected to the data line 430.

Hereinafter explained is the performance of the circuit of this second embodiment according to the present invention.

This embodiment relates to the data input and output circuit of an audio signal processing means which performs the inputting and outputting of the given audio data.

An example of a serial data transmission format of the audio data is shown in FIG. 5, which is of an Inter IC Sound (hereinafter referred to as "I²S").

In the audio data transmission by the use of the I²S format, the serial data transmission is carried out in the MSB first after one cycle of the bit clock against the inversion edge of the LR clock.

The bit clock shown in FIG. 5 is inputted to the data shift signal 441 as the transmission clock, the LR clock is inputted to the data latch signal 442 as the word cycle signal and the data are inputted to the serial data input terminal 406.

The audio data length is of 16 bits or 18 bits and, the data is inputted in the up-justified position 3 with respect to the internal data bus.

At each sampling cycle, the audio data of 16 bits or 18 bits is inputted from the serial data input terminal 406. The data latch signal 442 becomes active in synchronization with the edge of the LR clock indicating the word timing of the given data and the bit clock is inputted to the data shift signal 441.

Hereinafter is explained the performance of the circuit in the instance where the audio data length is of 16 bits.

The audio data inputted from the serial data input terminal 406 are taken into the shift register 401 in synchronization with the data shift signal 447. At this instance, the data shift signal 447 is inputted for 16 bits during the period in which the data shift enabling signal 446 sent out from the counter 408 is active, that is, from the timing of the next trailing edge immediately after the data latch signal 442 has become active. When the data transmission of 16 bits is completed, the data are held in the bit 15-bit 0 positions of the shift register 401. Here, when the barrel shifter 402 is instructed for the upper 2 bits shifting through the shifting amount control signal 443 and, under this state, the next inversion of the LR clock takes place, that is, when the data latch signal 442 becomes active. When the data latch signal 442 becomes active, the data latch signal 448 becomes active with a delay of one cycle with respect to the data shift signal 441, the audio data of 16 bits held at the shift register 401, are taken-out in the up-justified position to the data latch 403 and, at the same time, the output audio data held at the data latch 404 are inputted to the shift register 401. In this instance, if the output is selected at the side of the data line 430 through the selection signal 444, the output audio data of 16 bits are outputted from the serial data output terminal 407 in synchronization with the data shift signal 447.

By masking the data latch signal 448 and selecting the data line 429 through the selecting circuit 405, it is possible to output the inputted audio data in the state as inputted, that is, without any changes therein.

Next, the explanation is made in the instance of the arrangement where the data length of the audio data is of 18 bits.

The audio data inputted from the serial data input terminal 406 are taken into the shift register 401 in synchronization with the data shift signal 447. The data shift signal 447 is inputted in the amount of 16 bits during the period in which the data shift enabling signal 446 sent out from the counter 408 is active, that is, from the timing of the next trailing edge immediately after the data latch signal 442 becoming active. When the data transmission of 16 bits is completed, the data are held in the bit 17-bit 0 positions of the shift register 401. Here, the barrel shifter 402 is instructed through the shifting amount control signal 443 as to the "0" shifting. Under this state, the inversion of the LR clock is awaited and when the data latch signal 442 and the data latch signal 448 followed thereby become active, the audio data of 18 bits held at the shift register 401 are taken in the data latch 403. At the same time, the audio data held at the data latch 404 are inputted to the shift register 401. If the data line 430 is selected through the selecting circuit 405, the output audio data held at the shift register 401 is outputted from the serial data output terminal 407 in synchronization with the data shift signal 447.

By masking the data latch signal 448 and selecting the data line 430 through the selecting circuit 405, it is possible to output the inputted audio data as inputted, that is, without any changes therein.

The selecting circuit 405 is connected to the data line 423 after the selection of any one of the data lines 429 and 430 according to the value of the selection signal 444.

When the value indicated by the selection signal 444 is "0", the data line 429 is connected to the data line 423. The data line 429 is connected to the output of the bit 15 position of the shift register 401. At the same time, the data latch signal 442 is masked and the data length of 16 bits is selected through the data length indicating signal 445, it is possible to have the inputted data of 16 bits outputted without effecting any internal data transfer process and to carry out the data transmission in accordance with the transmission format 502 as shown in FIG. 5.

When the value indicated by the selection signal 444 is "1", the data line 430 is connected to the data line 423. The data line 430 is connected to the output of bit 17 position of the shift register 401. Here, when the data length of 16 bits is selected through the data length indicating sign al 445, the data of the upper 16 bits of the output data held at the data latch 404 are outputted in synchronization with the data shift signal 441, thereby enabling the data transmission according to the data transmission format 503 shown in FIG. 5.

When the data length of 18 bits is selected by the data length indicating signal 445, the output data held at the data latch 404 are outputted in synchronization with the data shift signal thereby making it possible to effect the data transmission in accordance with the data transmission format 501.

Further, in this instance, when the data length of 18 bits is selected and, simultaneously, the data latch signal 448 is masked, it is possible to output the inputted audio data of 18 bits in the next cycle.

According to the present invention, the data shift circuit for both the input part and the output part is made up of one common circuit so that the data inputted from the serial data input terminal in synchronization with the transfer cycle of the serial data of one word are held after being read out from the parallel output terminal and the output from the data latch means holding the output data is simultaneously taken-in from the parallel input terminal and is outputted in synchronization with the serial data transfer clock. Because the data shift circuit is made up of one common circuit for the input part and the output part, the circuit scale therefor is reduced to half the scale of the conventional circuit having separate two data shift circuits and, since the clock is in common for both the inputting and the outputting of the serial data, it is made possible to reduce the jitter in the transmission clock which may occur during the transmission of the data.

Also, since, according to the present invention, the inputting and outputting of the serial data are effected through one data shift circuit, the serial data inputted is outputted in the state as inputted without the data being transferred through the internal data bus when there is no need of making any data processing in the digital signal processing means. This means that it is possible to carry out in the data processing means any other processes which are independent of the data transfer process and this will improve the overall operation efficiency of the circuit.

While the invention has been described in its preferred embodiments, it is to be understood that the words which have been used are words of description rather than limitation and that changes within the purview of the appended claims may be made without departing from the true scope and spirit of the invention its broader aspects.

What is claimed is:

1. A serial data transmission circuit for a data transmission in a serial form, comprising:
 a serial data input terminal receiving a serial data externally applied;

a serial data output terminal outputting a processed serial data;

a transmission clock input terminal receiving a data shift signal;

a word cycle signal input terminal receiving a data latch signal;

a shifting amount control signal terminal receiving a control signal;

a selection signal terminal;

an internal data bus connecting a parallel data input terminal and a parallel data output terminal to the serial data transmission circuit for inputting parallel data to and outputting parallel data from the data transmission circuit, respectively;

a multi-bit data shaft means having a first input terminal connected to said serial data input terminal for receiving therefrom data supplied serially, a plurality of second input terminals each corresponding to a respective bit, a plurality of parallel output terminals each corresponding to a respective bit for outputting the data of the respective bit, said parallel output terminals including first parallel outputs and second parallel outputs, a first control input terminal connected to said transmission clock input terminal and supplied with said data shift signal therefrom, and a second control input terminal connected to said word cycle signal input terminal and supplied with said data latch signal therefrom so that said data shift means, in synchronization with each clock pulse of the data shift signal supplied thereto, processes the data supplied to said first input into bits of a first stage and shifts the data of each of the bits to the bits of a next stage and, in response to said data latch signal supplied thereto, processes the data supplied to said second input terminals into corresponding bits;

a barrel shifter having a first input connected to said first parallel outputs and a second input connected to said shifting amount control signal terminal, and an output, said barrel shifter receiving said control signal from said shifting amount control signal terminal and in response to said control signal, shifting a bit position of the data inputted therein from said data shift means;

a first data latch means having an input connected to said internal data bus, and an output connected to said second input terminals of said data shift means and temporarily storing multi-bit data to be supplied to said data shift means via said second input terminals;

a second data latch means having a first input connected to said output of said barrel shifter and a second input connected to said word cycle signal input terminal to receive said data latch signal therefrom, and an output connected via said internal data bus to said first data latch means, said second data latch means upon receiving said latch signal, temporarily storing the data supplied from said data shift means via said barrel shifter; and a selecting means having inputs connected to said second parallel outputs and an output connected to said serial data output terminal;

said selecting means further including an input receiving a selection signal from said selection signal terminal and selecting and outputting in response to said selection signal one of said inputs thereof so as to select and output to said serial data output terminal a selected bit data from one of said second parallel outputs of said multi-bit data shift means.

2. A serial data transmission circuit according to claim 1, wherein said barrel shifter includes a circuit for expanding the most significant bit (MSB) of the inputted data towards an upper bit position by the number of the bits which have been shifted towards a lower bit position.

3. A serial data transmission circuit according to claim 1, wherein said barrel shifter includes a circuit for adding bit "0" at a lower bit position by the number of the bits which have been shifted toward an upper bit position.

4. A serial data transmission circuit according to claim 1, wherein said second data latch means includes a circuit for processing the input data synchronously with the data latch signal.

5. A serial data transmission circuit according to claim 1, wherein said barrel shifter includes a circuit for shifting a data synchronously with the data shift signal and a circuit for processing a parallel data synchronously with the data latch signal.

6. A serial data transmission circuit according to claim 1, wherein said serial data input terminal is adapted to input an audio data.

7. A data transfer circuit comprising:

a serial input terminal for receiving a serial data to be transferred bit by bit in synchronization with a clock signal;

a transmission clock input terminal receiving a clock signal;

an input terminal receiving a data latch signal;

a first storage means for temporarily storing a data to be transferred consisting of a plurality of bits;

a shift register connected to said serial input terminal, said transmission clock input terminal, said input terminal receiving a data latch signal and said first storage means, for processing said data to be transferred in response to a data latch signal from said input terminal, for shifting said data bit by bit in synchronization with said clock signal received from said transmission clock input terminal and for processing the serial data supplied to said serial input terminal;

a second storage means connected to said shift register and to said input terminal receiving a data latch signal, said second storage means receiving information from said shift register and temporarily storing the information of said shift register in response to said data latch signal;

a serial output terminal for outputting a processed data;

a control signal terminal;

a barrel shifter interconnected between said shift register and said second storage means and receiving a shifting amount control signal from said control signal terminal and in response thereto shifting a bit position of the information supplied from said shift register to said second storage means; and selecting means connected between said shift register and said serial output terminal for selecting a bit data to be received from said shift register and supplying a selected bit data of said shift register to said serial output terminal.

* * * * *